Sept. 18, 1928. 1,684,853
E. A. WHITE
MOTION STORAGE APPARATUS
Filed Aug. 2, 1926 2 Sheets-Sheet 1
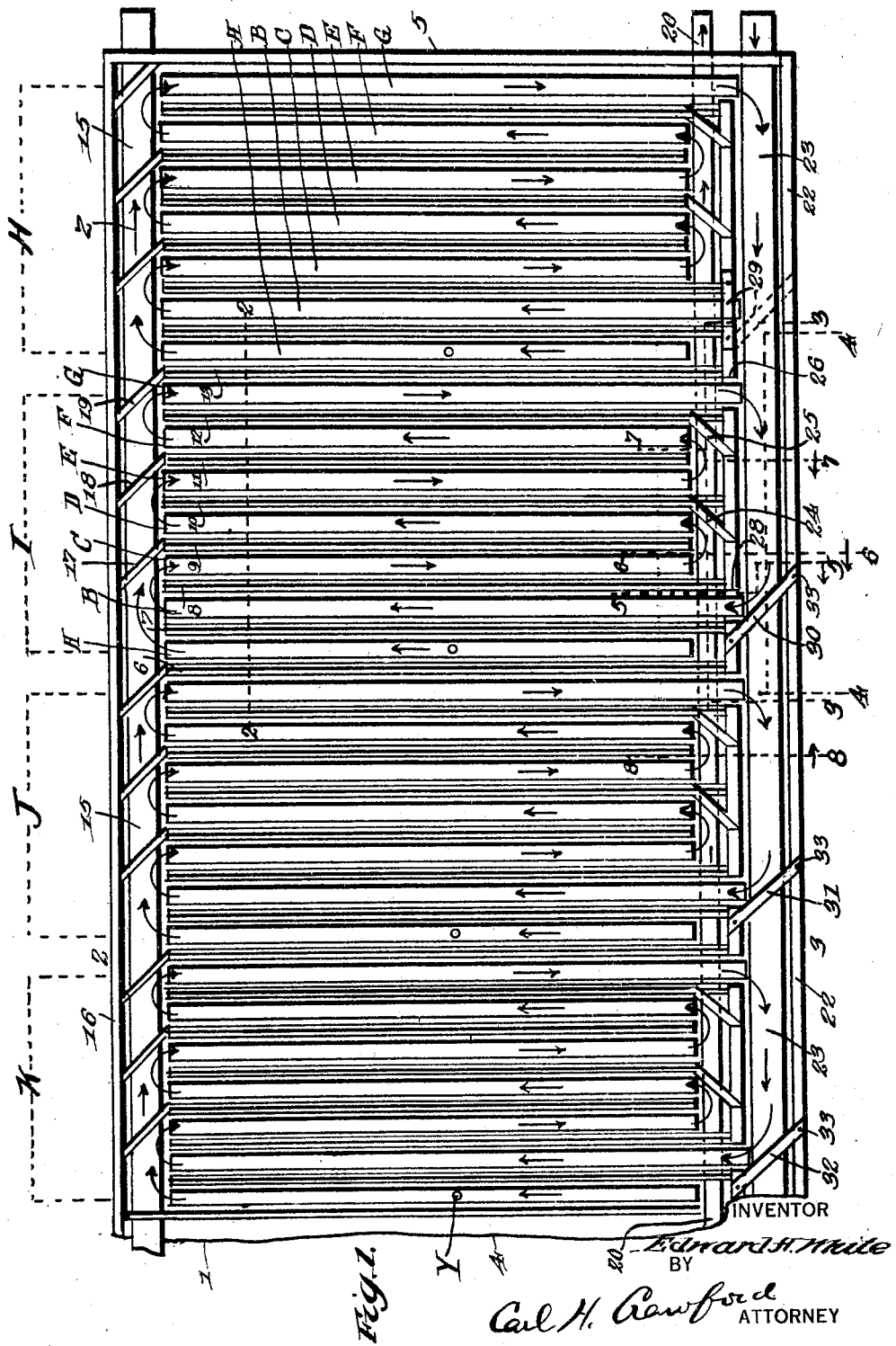

Sept. 18, 1928.
E. A. WHITE
1,684,853
MOTION STORAGE APPARATUS
Filed Aug. 2, 1926
2 Sheets-Sheet 2
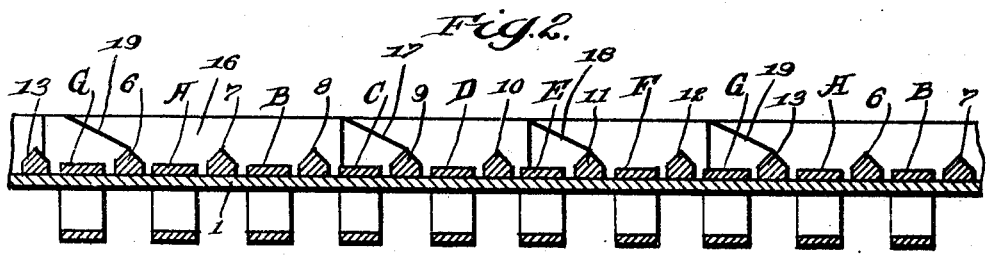
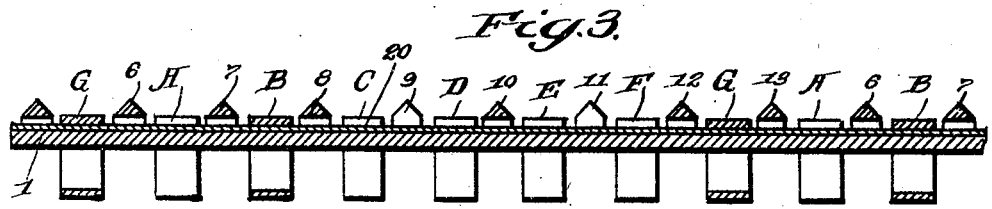
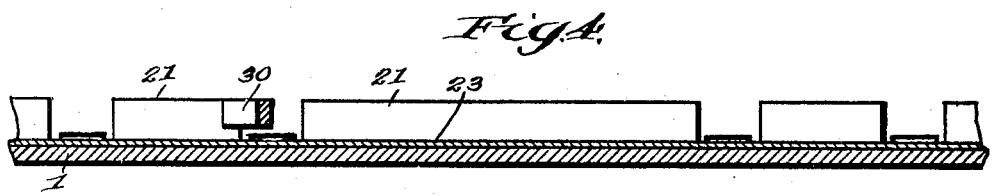
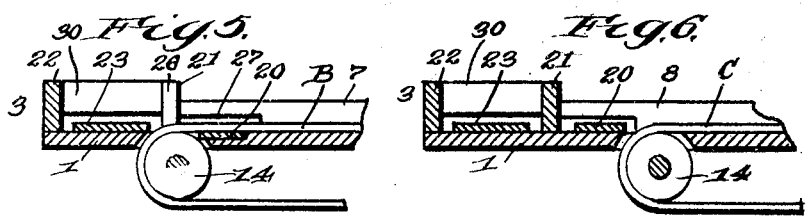
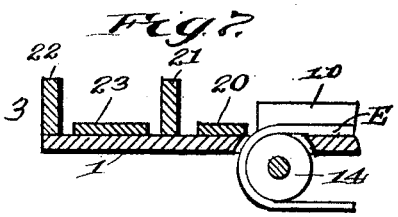
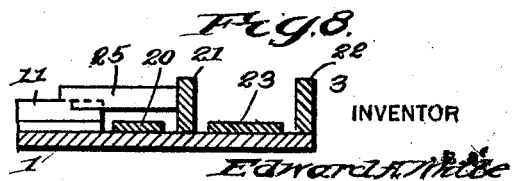
INVENTOR
Edward A. White
by Carl H. Crawford
ATTORNEY Patented Sept. 18, 1928.

1,684,853

UNITED STATES PATENT OFFICE.

EDWARD A. WHITE, OF LEWISTON, IDAHO.

MOTION STORAGE APPARATUS.

Application filed August 2, 1926. Serial No. 126,560.

The object of this invention is to provide an improved motion storage table of the general character disclosed in my application filed March 6, 1926, Serial No. 92,930.

The present invention involves a table on which the upper or operative laps of a series of belts travel, these belts being in practice, segregated into groups which are called bins, there being one bin for each sized fruit, and the fruit being delivered to one of the belts by any suitable means, such as a sizing conveyor, as illustrated in my former case.

In many instances, the stock of fruit will run preponderantly high, in one size, and therefore while it is an object of the invention to provide each belt fruit bin with an excess storage capacity to take care of the average run variation, such excess capacity will not always be sufficient to accommodate a preponderantly high run in one size of fruit.

Therefore, it is a feature of this invention to render the table elastically adjustable so that when a type of fruit runs inordinately high and cannot be accommodated by one bin, then two or a series of bins, or in fact all the bins on the table, can be co-ordinated with a view to enlarging the storage capacity to accommodate any variation of size runs.

It is also a feature of this invention to provide novel means of making transfer of fruit entities singly from one bin belt to the other by a transfer belt that functions for such transfer with respect to all the belts of all the bins, thereby avoiding the necessity of individually driven devices between adjacent bin belts.

It is a feature of my invention to provide each bin with an ingress and an egress belt which extends or travels in superimposed relation to the transfer belt, and which ingress and egress belts extend into transfer relation to a combination bin transfer belt, these ingress and egress belts, together with novel transfer means being adapted to be selectively disposed, making it possible for stored fruit, not picked up by the packers, travelling either through the complete circuit of one bin, or throughout the complete circuit of two or more bins.

My invention has many other features and objects which will be more fully described in connection with the accompanying drawings and which will be more particularly pointed out in and by the appended claims.

In the drawings:

Fig. 1, is a plan view of my improved motion storage table.

Fig. 2, is an enlarged sectional view on line 2—2 of Fig. 1.

Fig. 3, is a sectional view on line 3—3 of Fig. 1.

Fig. 4, is a sectional view on line 4—4 of Fig. 1.

Fig. 5, is a sectional view on line 5—5 of Fig. 1.

Fig. 6, is a sectional view on line 6—6 of Fig. 1.

Fig. 7, is a sectional view on line 7—7 of Fig. 1.

Fig. 8, is a sectional view on line 8—8 of Fig. 1.

Like characters of reference designate similar parts throughout the different figures of the drawings.

The table which is generally indicated at 1, has a flat top of the general outline shown in Fig. 1, and in practice, sizing conveyors or like delivery means (not shown) are employed to make delivery of the fruit to the receiving belts, which will be later designated and described. The arrangement is such that packers can work freely any place along both sides of the table 1, and for convenience in describing the structure, I will generally designate side 2, as the detour side, and side 3, the transfer side. The ends of the table are designated at 4 and 5.

I will next describe my improved belt bins and the functions they are designed to perform.

As all the bins are alike in structure and function, only one need be described in detail. I have shown the table provided with four bins, each bin comprising seven belts, and to facilitate a description of the same, I will designate the bin belts by letter, the same being indicated A, B, C, D, E, F and G, all other portions being designated by numerals. On both sides of each belt, there is a dividing strip, designated by 6 to 13, inclusive, and adjacent the detour side 2, these strips terminate substantially abreast of the detour ends of the belts A to G. As will be more clearly seen by reference to Fig. 2, the belts A to G are just wide enough to support apples in single file, and the strips 6 to 13, are so spaced that the apples cannot roll off from the belts, a working clearance of practical extent being afforded between the edges of the belts and said strips. Belts A, B, D, and F, travel toward the detour side 2, of table 1, and belts C, E and G, travel toward the transfer side 3, of the table 1, as clearly indicated by the arrows. Thus, it will be seen that I have shown adjacent belts which not only travel in parallel relation but which travel toward both sides of the table, and certain of said adjacent belts travel in opposite directions with respect to each other. These belts are trained over rollers, as generally indicated at 14, and they may be driven in any suitable manner, at the same speed, which it is not necessary to show. Before entering into further detailed description of said belts, I will next describe the detour side of said table.

A detour belt 15, runs lengthwise of the table on the detour side 2, the inner edge being abreast of the detour ends of the belts A to G, of all the bins so that those belts travelling toward the detour side 2, will deliver to said belt 15. Thus both belts A and B, deliver to belt 15, and an outer wall 16, prevents the apples from rolling outwardly off from belt 15. After the apples from belts A and B, have been delivered onto belt 15, they are carried to the right of Fig. 1, as indicated by the arrow Z. A deflector means such as a bar 17, extends from wall 16 to strip 9, in a clearance overhang to belt 15, and deflects the apples from belt 15 onto belt C, where they are advanced toward the transfer side 3, of the table. Apples delivered to belt 15, by belt D, are detoured by a deflector bar 18, onto belt E, and apples delivered to belt 15 by belt F, are detoured by deflector 19, onto belt G. I will generally designate the four bins by the letters H, I, J, and K, and it may be stated that the foregoing arrangement of deflectors for the bin I, just described, is also provided for each of the other three bins.

I will next refer to the transfer side of the motion storage table and will describe the same in detail prior to a description of the operation.

What I will term a transfer belt 20, runs lengthwise of table 1, on the transfer side 3, in transferring relation to the ends of all the bin belts except the egress and the ingress belts thereof, which will be later described, and said transfer belt 20, travels to the right of Fig. 1, in the same direction as belt 15 travels. On that side of belt 20, remote from the adjacent bin belt ends, I provide a stop partition 21 which serves to prevent the apples from rolling off from belt 20, in a direction toward said partition. Outside said stop partition 21, I provide a side wall 22, between which and said partition 21, the upper lap of a belt 23, travels to the left of Fig. 1, or in a direction opposite to the directions of travel of belts 20 and 15. I will term belt 23, a combination bin transfer belt because its function is either to transfer the fruit from the egress belt to the ingress belt of one bin, or from the egress belt of one bin to the ingress belt of one or more remote bins, as will later appear.

Reverting to the means whereby apples are transferred from one adjacent belt to the other, it will be seen that belt C, delivers to belt 20, and I provide means in the form of a transfer bar 24, extending from partition 21 to strip 10, to coact with the partition 21 to transfer the apples from belt 20 to belt D. Likewise, belt E, delivers to belt 20, and a transfer bar 25, extending from partition 21 to strip 12, acts to transfer the apples from belt 20 to belt F. Thus, it will be seen that belts A, C, D, E and F, all terminate adjacent the inner edge of the transfer belt 20, although the transfer relation is not effective as regards belt A, for a purpose which will later appear.

Each bin has an ingress belt and an egress belt, and these belts are designated respectively by the letters B and G. Each bin also has a receiving belt, and this belt is the one designated at A. I have shown circles Y, on the receiving belts A, to indicate where the apples are delivered, one by one, as in my prior application hereinbefore identified. Thus, these belts A, will only actively function in advancing the apples from points Y toward belt 15, and those portions of belts A, from points Y toward belt 20, will be inactive as far as any fruit advancing function is concerned.

The egress belt G, extends in superimposed relation over the top of belt 20, and projects as shown in Figs. 1 and 5, into delivery relation with belt 23, the partition 21, being interrupted at 26, for this purpose. I preferably extend the dividing strips 12 and 13, across belt 20, and into abutting relation with partition 21, to guide the apples and prevent them from rolling off from belt G. The strips 12 and 13 will be suitably recessed, as shown at 27, to afford clearance for the belt 20. Likewise, the ingress belt B, extends over belt 20, and through an opening 28, in partition 21, so that apples may be transferred from belt 23 to belt B.

I will next refer to an important feature of my invention whereby the utmost flexibility can be obtained in increasing the storage capacity for any size fruit that happens to run preponderantly high.

I provide deflector means in the form of bars which I will designate at 29 to 32, inclusive, said bars being mounted upon partition 21 and wall 22, and extending across the intervening space between said walls in free working clearance above belt 23. It is immaterial how the bars may be fastened, and I have shown means for this purpose which may take the form of pins 33, which may be easily insertable and withdrawable by hand, or the bars may have a mortice and tenon engagement, with partition 21 and wall 22. In any event, the bars 29 to 32 constitute means that are selectively positioned or withdrawn, with a view of reducing or increasing, as the case may require, the motion storage capacity of the table, for a given size fruit. For instance, if it is desired to enlarge bin H, by including bin I, then bar 29, is shifted from the dotted line position into the full line position, thereby closing the opening in partition 21, through which the ingress belt B, of bin H, projects. Thus, the fruit entering onto belt 23, from egress belt G, of bin H, would be advanced by belt 23 to bar 30, which would shunt the fruit onto ingress belt B of bin I.

Describing the operation briefly, in view of the foregoing specific description, reference will be had primarily to Fig. 1.

In the first place, we will assume that each of the bins H, I, J and K are each to be used for one size fruit and that the fruit in each bin will be confined to such bin. With this arrangement, the bar 29, would be in the dotted line position and bars 30, 31 and 32, would be in the full line positions shown. In this adjustment, there would be no coaction between the bins and each bin would perform its individual function without relation to the remaining bins, hence the operation of only one bin need be described in detail although the belts 15, 20 and 23, will always coact with all the bins.

Thus, taking bin I, the fruit, one by one, will be deposited at Y, on belt A and will be advanced in single file toward and delivered one by one onto belt 15, which is travelling to the right of Fig. 1. The bar 17, will detour the fruit onto belt C, which will advance the same toward and will deliver it onto transfer belt 20, and bar 24 will shunt the fruit onto belt D, which will advance the fruit toward and deliver it to belt 15. Bar 18, will shunt the fruit back onto belt E, which will advance the fruit onto belt 20, and bar 25, will shunt the fruit onto belt F. Belt F, will deliver the fruit to belt 15, and bar 19, will shunt the fruit onto egress belt G, which will carry the fruit over transfer belt 20 and deliver the fruit to belt 23, and as the latter is travelling to the left of Fig. 1, the fruit will stay on belt 23 until it reaches bar 30. This bar 30, will shunt the fruit onto ingress belt B, and the latter will deliver the fruit to belt 15. Thus, I have specifically described one complete endless circuit of the fruit throughout one bin.

It will be understood that the purpose of this endless circuit is to provide storage for each size fruit and render the same accessible from both sides of the table for withdrawal by packers suitably distributed therealong. Thus, the packers will be constantly picking up apples from the various belts within their reach, and probably, no single apple will ever make a complete circuit, although such a thing is clearly possible. It will now be clear that that portion of belt A, which is the receiving belt, which extends from the point Y, toward belt 20, does not deliver or receive fruit to or from belt 20, and is to all intents and purposes, non-functioning.

Now assume that the size of fruit delivered to bin I, was running preponderantly high and filled up the bin faster than the packers could withdraw it, or assume that the run was so high that it required more packers and hence more table space. Well, in such an event, it will be assumed that one additional bin say bin H, would afford the desired increased storage space, then, in that event, delivery would be arrested to point Y, of belt A, on bin I, and delivery would be made exclusively to point Y, of belt A, in bin H. Thus, belt A, of bin I, would then become wholly inactive. Bar 29, would be removed entirely from its dotted line position to the full line position thereby closing off ingress belt B, of bin H, and rendering said belt inactive. Bar 30, would remain in the full line position shown.

Thus, fruit delivered to point Y, of belt A, of bin H, would traverse the circuit of bin H, which will now be understood, and would be discharged from belt G, of bin H, onto belt 23, which would carry the fruit past ingress belt B of bin H, and toward and to bar 30, which would shunt the fruit onto ingress belt B, of bin I. Thus, the complete circuit of the fruit with both these bins operatively connected, would be substantially twice as long, and consequently, substantially twice the motion storage capacity would be afforded as compared to the single bin I. A greater number of packers could be accommodated at both sides of the table and the preponderant run could be cared for. From the foregoing, it will be seen that any number, or in fact all the bins of a table could readily be connected up to operate as one bin, thereby affording an equipment that is amply adequate for meeting the most abnormal requirements.

While in practice, the belt integers of the several bins will vary slightly in size, to accommodate the different sized fruit, such variation not being so marked as to interfere with the operation of several bins on one size of fruit, as openings 26 and 28, would be large enough to permit the largest size fruit to pass.

It will be understood that the belts will all be travelling at practically the same speed, and that the speed will be of a very low rate, comparatively. In fact, the rate of speed will be so low that if two apples came into contact, they could not possibly be bruised or "burned."

It is desired to point out that throughout a preponderant maximum travel of the fruit entities they will always be in separated relation. This is a great desideratum of this invention as any "spinning" or rubbing of the fruit entities against each other, materially reduces the keeping qualities and otherwise detracts from the market value. In order to prevent momentary retardation of the fruit entities when transfer is made from one belt to the other, the terminal of the discharging belt is slightly but sufficiently elevated with respect to the level of the belt onto which the discharged apple is received so that the apple will proceed on its way without any appreciable delay at any discharge or transfer point. Likewise, the belt terminals receiving the fruit entities will be slightly and sufficiently lowered so that there will be no hesitation of the fruit in leaving such belts, as for instance, belts 15, 20 or 23, for the bin belts. Such adjustment of the belt terminals is not appreciable on the scale at which the drawings are made, and cannot be shown, however with the foregoing description of the structure and the advantageous reasons flowing therefrom, it would be clearly within the skill of any mechanic to make such adjustments of the belt terminals.

The only possible chance of two apples coming into contact would be when belts A and B are both simultaneously delivering to belt 15 and the apples from both belts are detoured by bar 17. However, this would be practically negligible since few apples ever make a complete circuit unless the packers for any reason cease work for a few moments, or slow up, and permit a surplus to accumulate. Further, it will be clear that what apples actually do make a complete circuit, would be of a greatly reduced number with respect to the apples fed to belt A. Where bins, such as I and H, are combined, and belt A, of bin H, is inactive, then in no event, could there be contact of apples to belt 15, adjacent the right endmost bar 17 of bin H.

Thus, the apples will, in the great majority of cases be always advanced not only in single file but in spaced relation.

It is believed that the device of my invention will be fully understood from the foregoing description, and while I have herein shown and described one specific form of my invention I do not wish to be limited thereto except for such limitations as the claims may import.

I claim:

1. In a motion storage apparatus, a motion storage table having transfer and detour sides, a plurality of belt fruit bins on said table between said sides, one bin for each size fruit, each bin comprising a series of storage belts travelling in parallel relation toward both sides of said table and being sufficiently narrow to advance the fruit in single file thereon, one endmost belt of each bin being a receiving belt and the next belt adjacent thereto being a bin ingress belt and the opposite endmost belt of each bin being a bin egress belt, an individual transfer belt on the transfer side of said table travelling in one direction in transfer relation to the ends of all the bin belts except the ingress and egress belts, a stop partition along that side of said transfer belt remote from the bin belts and transfer bars coacting with said partition for single transfer of fruit from one to the other of said bin belts, a combination bin transfer belt outside said stop partition and travelling lengthwise along said transfer side of said table in a direction opposite to the direction of travel of said transfer belt, said ingress and egress belts extending over said transfer belt and through said stop partition into transfer relation to said combination bin transfer belt, bin transfer bars extending over said combination bin transfer belt and being selectively positioned to either transfer fruit from the egress to the ingress belt of one bin or from the egress belt of one bin to the ingress belt of any other bin to thereby enlarge the storage capacity of the table with respect to one size fruit, and means at the detour side of said table for detouring fruit from one bin belt to others.

2. In a motion storage apparatus, a motion storage table having transfer and detour sides, a plurality of belt fruit bins on said table between said sides, each bin comprising a series of storage belts travelling in parallel relation toward both sides of said table to advance the fruit thereon, one endmost belt of each bin being a receiving belt and the next belt adjacent thereto being a bin ingress belt and the opposite endmost belt of each bin being a bin egress belt, an individual transfer belt on the transfer side of said table travelling in one direction in transfer relation to the ends of all the bin belts except the ingress and egress belts, a stop partition along that side of said transfer belt remote from the bin belts and said partition having means coacting with said belts and said partition for transferring fruit from one to the other of said bin belts, a combination bin transfer belt outside said stop partition travelling lengthwise along said transfer side of said table in a direction opposite to the direction of travel of said transfer belt, said ingress and egress belts extending over said transfer belt and through said stop partition into transferring relation to said combination bin transfer belt, bin transfer means extending over said combination bin transfer belt and being adapted to be selectively located to either transfer fruit from the egress to the ingress belt of one bin or from the egress belt of one bin to the ingress belt of a remote bin to thereby enlarge the storage capacity of the table for an over-run of one size fruit, and means at the detour side of said table for detouring fruit from one bin belt to others.

3. In a motion storage apparatus, a motion storage table provided with a transfer belt, a plurality of bin belts travelling in opposite directions and terminating abreast of one side edge of said transfer belt whereby one bin belt will discharge onto and another bin belt will receive from said transfer belt, said bin belts including an egress and an ingress belt extending over said transfer belt, and a combination bin belt for receiving from said egress belt and delivering to said ingress belt.

4. In a motion storage apparatus, a motion storage table having a detour side and a transfer side, a plurality of belt bins each composed of a plurality of belts delivering toward both sides of said table, a detour belt on the detour side of said table coacting with the belts of all the bins, a transfer belt on the transfer side of said table coacting with certain of the belts of all the bins, and a combination bin belt on the transfer side of said table coacting with the outside belts of one bin or with a belt of one bin and a belt of a remote bin.

5. In a motion storage apparatus, a motion storage table having a detour side and a transfer side, a plurality of belt bins on said table each composed of a series of bin belts travelling in opposite directions toward both sides of said table, a detour belt coacting with the bin belts of all said bins, means coacting with the fruit delivered onto said detour belt for serially detouring the fruit back onto said bin belts, a transfer belt on the transfer side of said table, means coacting with the fruit on said transfer belt for serially returning the fruit to said bin belts, and a combination transfer belt on said transfer side for returning fruit from one end of one bin to the other or from one end of one bin to a bin remote therefrom.

6. In a motion storage apparatus, a motion storage table provided with a belt bin including a plurality of parallel belts with adjacent belts moving in opposite directions and toward both sides of said table and one endmost belt being an egress belt, sets of devices at both sides of said table co-acting with said belts to cause the fruit entities to be advanced serially on said belts and consecutively toward and finally onto said egress belt, and said bin also including an ingress belt at that end of the bin opposite said egress belt end and coacting with said devices, and also a receiving belt at the extreme end of said bin opposite said egress belt end and said receiving belt coacting with one set of said devices and moving in the same direction as said ingress belt.

7. In a motion storage apparatus, a motion storage table having a transfer side, a plurality of belt bins on said table each composed of a series of bin belts travelling in opposite directions, a transfer belt on the transfer side of said table, means coacting with the fruit on said transfer belt for serially transferring the fruit to said bin belts, and a combination transfer belt on said transfer side for returning fruit from one end of one bin to the other or from one end of one bin to a bin remote therefrom.

8. In a motion storage apparatus, a motion storage table having a detour side and a transfer side, a plurality of belt bins on said table each composed of a series of bin belts travelling in opposite directions toward said detour and transfer sides of said table, means on said detour side for transferring fruit from one bin belt to the other, means on said transfer side for transferring fruit from one bin belt to the other, and means for transferring fruit from one bin to another bin.

9. In a motion storage apparatus, a motion storage table having a plurality of fruit bins thereon each composed of a series of inter-related belts travelling to advance the fruit in endless paths, said series of inter-related belts including belt mechanism coacting with all of said bins to complete an endless path for individual bins or complete an endless path involving a plurality of said bins.

10. In a motion storage apparatus, a motion storage table having a transfer side, a plurality of oppositely travelling bin belts on said table including an ingress and an egress belt, dividing strips between said belts, a transfer belt travelling along the transfer ends of all of said bin belts except said ingress and egress belts and said transfer belt travelling beneath said ingress and egress belts, means for shunting fruit onto and off from said bin belts onto said transfer belt and vice versa, the dividing strips on both sides of said ingress and egress belts extending over said transfer belt, and a combination belt for transferring fruit from said egress to said ingress belt.

11. In a motion storage apparatus, a motion storage table having a detour side and a transfer side, a fruit bin on said table composed of a plurality of bin belts including a receiving belt and ingress and egress belts, detour belt means on the detour side of said table for detouring fruit from all of said belts the one to the other, transfer belt means at the transfer side of said table for transferring fruit from certain bin belts to others, and combination belt means for transferring fruit from said egress to said ingress belts.

12. In a motion storage apparatus, a motion storage table having a detour side and a transfer side, a fruit bin on said table composed of a plurality of bin belts travelling in different directions, detour belt means travelling in one direction along the detour ends of said bin belts for transferring fruit from one to the other of said bin belts, a transfer belt means at the transfer side of said table for transferring fruit from certain of said bin belts to others thereof and said transfer belt means travelling in the same direction as said detour belt means, and a combination belt means travelling in a direction opposite to and parallel with said transfer belt means for transferring fruit from certain of said bin belts to others thereof.

In testimony that I claim the foregoing as my own, I hereby affix my signature.

EDWARD A. WHITE.